United States Patent
Kim et al.

(10) Patent No.: US 8,208,415 B2
(45) Date of Patent: Jun. 26, 2012

(54) APPARATUS AND METHOD FOR CONTROLLING EFFECT OF INTERFERENCE IN WIRELESS COMMUNICATION SYSTEM

(75) Inventors: Sang-Bum Kim, Seoul (KR); Do-Young Kim, Yongin-si (KR); Eun-Taek Lim, Suwon-si (KR); Jung-Soo Woo, Suwon-si (KR); Geun-Ho Lee, Suwon-si (KR); Cheng Shan, Suwon-si (KR); Yong-Ho Park, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 627 days.

(21) Appl. No.: 12/378,143

(22) Filed: Feb. 11, 2009

(65) Prior Publication Data

US 2009/0221286 A1 Sep. 3, 2009

(30) Foreign Application Priority Data

Feb. 12, 2008 (KR) ........................ 10-2008-0012466

(51) Int. Cl.
*H04B 7/00* (2006.01)
*H04W 4/00* (2009.01)
*H04J 3/16* (2006.01)

(52) U.S. Cl. ........ 370/310; 370/328; 370/331; 370/338; 370/437

(58) Field of Classification Search ............ 370/32–329, 370/338, 340–341, 437
See application file for complete search history.

(56) References Cited

U.S. PATENT DOCUMENTS

| 6,360,098 | B1 * | 3/2002 | Ganesh et al. ............... | 455/436 |
| 6,487,409 | B2 * | 11/2002 | Qing-An ........................ | 455/436 |
| 2008/0096573 | A1 * | 4/2008 | Chu ............................. | 455/450 |
| 2009/0067354 | A1 * | 3/2009 | Gao et al. ..................... | 370/310 |

* cited by examiner

Primary Examiner — Brandon Renner

(57) ABSTRACT

An apparatus and a method for selecting a candidate channel to change an operating channel so as to minimize effect of interference in a wireless communication system using a Cognitive Radio (CR) function are provided. The method includes confirming an operating channel of at least one neighbor cell and candidate channel set to a third group by the neighbor cell; setting a candidate channel used as the operating channel of the neighbor cell among at least one candidate channels changeable to the operating channel, to a third group of lowest priority; setting candidate channels set to the third group of the neighbor cell among candidate channels not set to the third group, to a second group; and setting candidate channels set to neither the second group nor the third group, to a first group of highest priority.

18 Claims, 4 Drawing Sheets

APPARATUS AND METHOD FOR CONTROLLING EFFECT OF INTERFERENCE IN WIRELESS COMMUNICATION SYSTEM

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Feb. 12, 2008 and assigned Serial No. 10-2008-0012466, the entire disclosure of which is hereby incorporated by reference.

TECHNICAL FIELD OF THE INVENTION

The present invention relates generally to a wireless communication system using a Cognitive Radio (CR) function. More particularly, the present invention relates to an apparatus and a method for giving priority to candidate channels to change an operating channel in the wireless communication system.

BACKGROUND OF THE INVENTION

Recent advances of the wireless communication technology lead to the coexistence of systems using different communication schemes. For example, systems using the 2G Code Division Multiple Access (CDMA) scheme coexist with systems using the 3G International Mobile Telecommunication (IMT)-2000 scheme and systems using the 4G Orthogonal Frequency Division Multiplexing (OFDMA) scheme. The systems using different communication schemes provide services using different frequency bands.

Limited frequency resources for radio communications are insufficient for the coexisting systems of the different communication schemes.

To address this problem, research has been conducted on a Cognitive Radio (CR) technique, which senses unused frequency band or channel from the frequency bands allocated to a specific system and allows other system to use the sensed frequency band or channel. For instance, when a system for transmitting an incumbent signal allocates the frequency bands, the system does not use some channels of the allocated frequency band. In this case, to transmit the incumbent signal, a wireless communication system using the CR function detects the unused channels in the allocated frequency band and uses the detected channels to provide service to terminals in the service coverage.

When using the CR function as above, the wireless communication system services the terminals in the service coverage using the unused channels in the frequency band allocated to the particular system. When the incumbent signal intends to use the operating channels in use, the cells using the CR function should empty their operating channels. Accordingly, with the CR function, the wireless communication system cannot deliberately conduct the frequency planning in advance.

When using the CR function, the cells constitute a set of candidate channels to change their operation channel in use. When the incumbent signal intends to use the operating channel, the cells change the operating channel by selecting one of the candidate channels of the candidate channel set.

When the channel selected by the cell of the CR function to change the operating channel is the same as a channel of a neighbor cell, the wireless communication system is subject to the degradation of the system performance because of interference from the neighbor cell.

Hence, the wireless communication system using the CR function needs a basis for the cells to select channels to be included to the candidate channels and a basis for the cells to select a channel from the candidate channel set.

SUMMARY OF THE INVENTION

To address the above-discussed deficiencies of the prior art, it is a primary aspect of the present invention to address at least the above mentioned problems and/or disadvantages and to provide at least the advantages described below. Accordingly, an aspect of the present invention is to provide an apparatus and a method for giving priority to candidate channels to change an operating channel so as to minimize effect of interference between cells in a wireless communication system using a Cognitive Radio (CR) function.

Another aspect of the present invention is to provide an apparatus and a method for giving priority to candidate channels to maximize a distance between cells which reuse channels in a wireless communication system using a CR function.

According to one aspect of the present invention, a method for determining a priority of candidate channels at a serving node in a wireless communication system which uses a CR function includes confirming an operating channel of at least one neighbor cell and candidate channel set to a third group by the neighbor cell. The method also includes setting a candidate channel, used as the operating channel of the neighbor cell among at least one candidate channels changeable to the operating channel, to a third group of lowest priority The method further includes setting candidate channels, set to the third group of the neighbor cell among candidate channels not set to the third group, to a second group; and setting candidate channels set to neither the second group nor the third group, to a first group of highest priority.

According to another aspect of the present invention, a method for changing an operating channel at a serving node in a wireless communication system that uses a CR function includes setting at least one priority group with at least one candidate channel changeable to the operating channel by taking into account an operating channel of at least one neighbor cell. The method also includes when detecting an incumbent signal, selecting a candidate channel to change the operation channel based on priority of the candidate channels. The method further includes changing the operating channel to the selected candidate channel.

According to yet another aspect of the present invention, an apparatus for a base station to use a CR function in a wireless communication system includes a priority controller for generating at least one priority group with at least one candidate channel changeable to an operating channel of the base station by taking into account an operating channel of at least one neighbor cell. The apparatus also includes a controller for, when an incumbent signal is detected, selecting a candidate channel to change the operating channel based on priority of the candidate channels. Further, the apparatus includes a frequency controller for changing the operating channel under control of the controller.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged.

Exemplary embodiments of the present invention provide a technique for giving priority to candidate channels to change an operating channel in a wireless communication system using a Cognitive Radio (CR) function.

Hereinafter, while a base station using the CR function is assumed to use an unused channel in a broadcasting service system, the base station may utilize an unused channel of another system.

Figure 1:
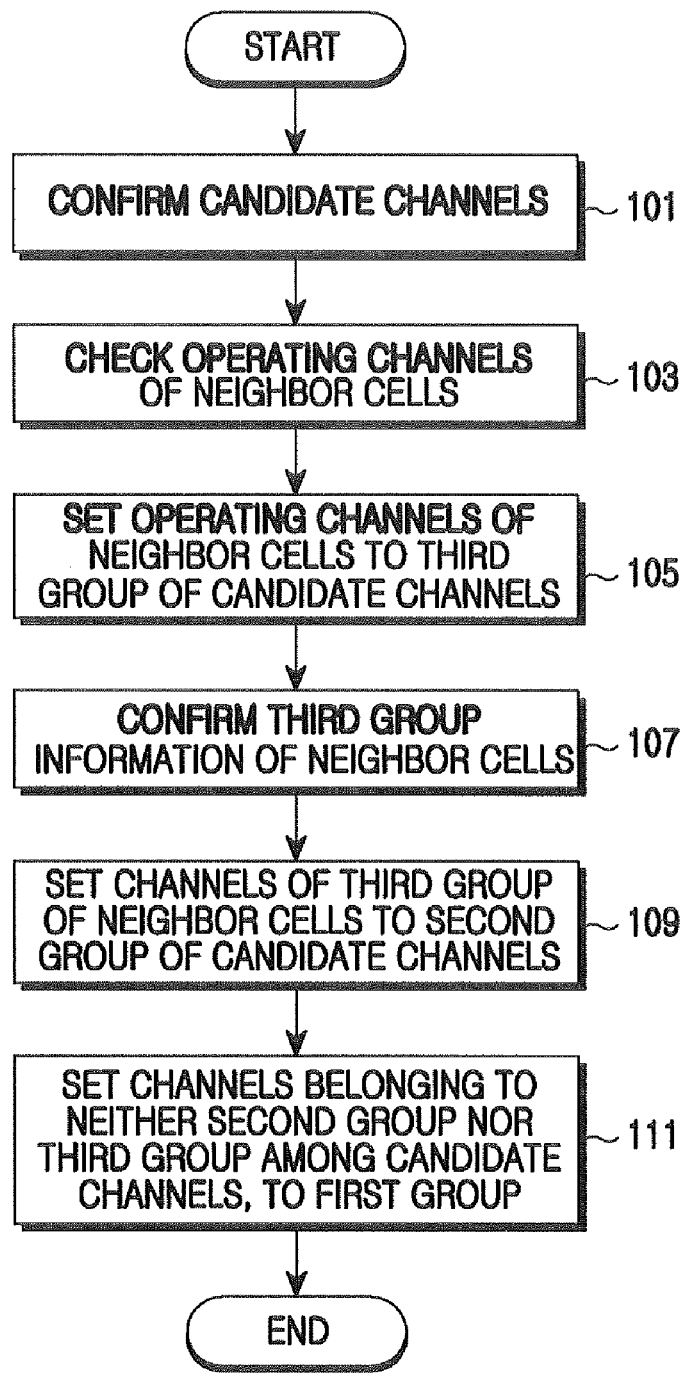
FIG. 1 is a flowchart of a method for giving priority to candidate channels in a wireless communication system according to an exemplary embodiment of the present invention.

Using the CR function, the base station, upon detecting an incumbent signal, changes its operating channel by selecting one of candidate channels of a candidate channel set. To select the candidate channel that minimizes interference with neighbor cells, the base station assigns a priority to each of the candidate channels. For example, the base station determines a group of the candidate channels given the same priority to assign the priority to the candidate channel as shown in FIG. 1. In one example, the base station includes three groups distinguished by the priority. Herein, a first group included to the candidate channel set indicates the set of the channels of the highest priority, and a third group indicates the set of the channels of the lowest priority.

FIG. 1 is a flowchart of a method for assigning priority to candidate channels in a wireless communication system according to an exemplary embodiment of the present invention.

When detecting an incumbent signal, the base station confirms candidate channels in step 101. The candidate channel is a channel selectable for the change of the operating channel of the base station.

In step 103, the base station checks the operating channels of the neighbor cells. For example, the base station checks the operating channels of the neighbor cells using Coexistence Beacon Protocol (CBP) packets provided from the neighbor cells. The base station transmits a CBP packet, including its operating channel information, to the neighbor cells.

In step 105, the base station sets candidate channels used as the operating channels of the neighbor cells amongst the candidate channels confirmed in step 101 as the third group. When the base station sets its operating channel to the same operating channel of the neighbor cells, interference is caused with the neighbor cells. Thus, the base station sets the candidate channels used as the operating channels of the neighbor cells to the third group with the lowest priority.

In step 107, the base station checks the candidate channels of the third group of the neighbor cells. For example, the base station confirms the candidate channels of the third group of the neighbor cells using the CBP packets provided from the neighbor cells. The base station transmits information regarding the candidate channels, set to the third group in step 105, to the neighbor cells using the CBP packet.

In step 109, the base station sets candidate channels belonging to the third group of the neighbor cells among the candidate channels, confirmed in step 101, to the second group. The base station removes the candidate channels, set to the third group in step 105, from the second group.

In step 111, the base station sets candidate channels belonging to neither the second group nor the third group among the candidate channels, confirmed in step 101, to the first group.

Next, the base station finishes this process.

As stated above, the base station confirms the operating channels and the third group information of the neighbor cells using the CBP packets. The CBP packets containing the operating channels of the neighbor cells may be the same as, or different from, the CBP packets containing the third group information of the neighbor cells. Accordingly, the base station can transmit its operating channel information and the third group information using the same CBP packets or using different CBP packets.

Figure 2:
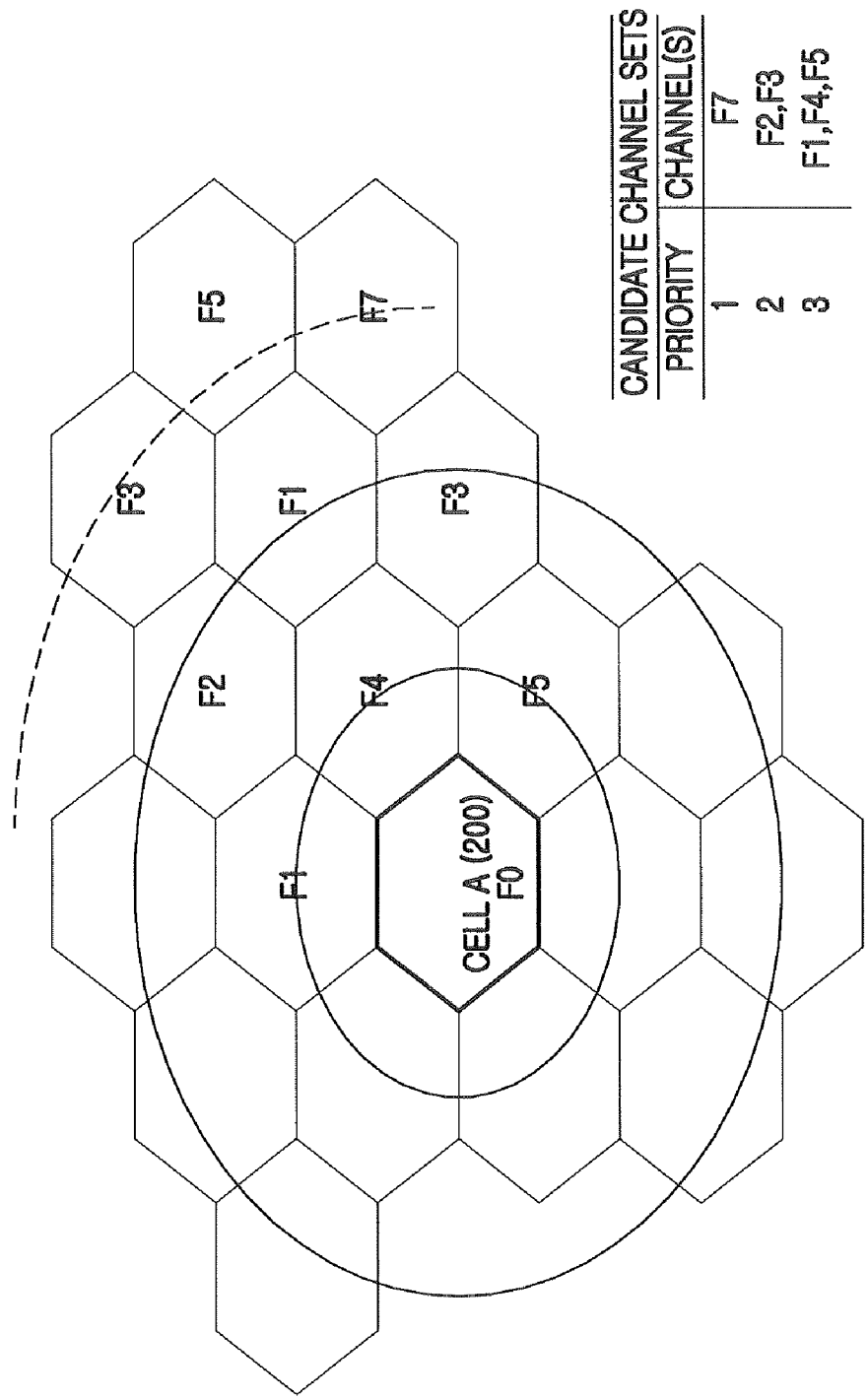
FIG. 2 is a diagram of a structure for giving priority to the candidate channels in the wireless communication system according to an exemplary embodiment of the present invention.

When the wireless communication system is configured as shown in FIG. 2, a base station 200 that manages a cell A gives priority to the candidate channels using CBP packets provided from neighbor cells.

FIG. 2 depicts a structure for giving priority to the candidate channels in the wireless communication system according to an exemplary embodiment of the present invention.

The base station 200, managing the cell A, uses a channel F0 as its operating channel in FIG. 2.

Provided that candidate channels of the base station 200 are F1 through F7, the base station 200 defines the operating channels F1, F3 and F5 of the neighbor cells as the third group. Herein, the base station 200 confirms the operating channels of the neighbor cells using the CBP packets.

Next, the base station 200 defines the candidate channels F1, F2 and F3 belonging to the third group of the neighbor cells as the second group. The base station 200 removes the candidate channel F1, which belongs to the third group among the candidate channels F1, F2 and F3 of the second group, from the second group. The base station 200 confirms the candidate channels belonging to the third group of the neighbor cells using the CBP packets.

After setting the second group and the third group, the base station 200 defines the candidate channel which belongs to neither the second group nor the third group amongst the candidate channels of the candidate channel set as the first group.

Figure 3:
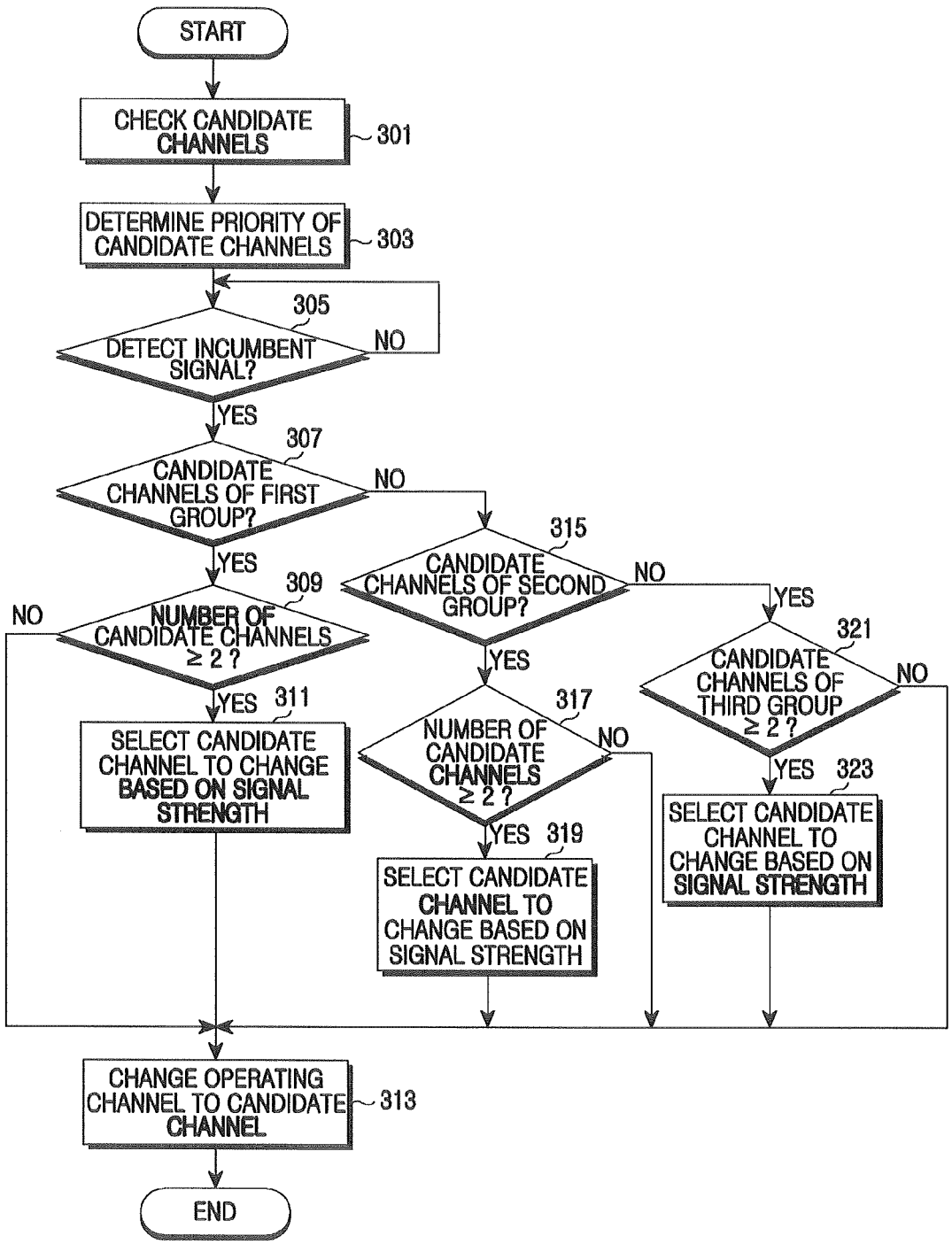
FIG. 3 is a flowchart of a method for selecting a candidate channel to change an operating channel in the wireless communication system according to an exemplary embodiment of the present invention.

After the candidate channels have been given the priority as above, when the base station detects an incumbent signal that the base station intends to use its operating channel, the base station changes the operating channel by taking into account the priority of the candidate channels as shown in FIG. 3.

FIG. 3 is a flowchart of a method for selecting a candidate channel to change an operating channel in the wireless communication system according to an exemplary embodiment of the present invention.

Detecting an incumbent signal, the base station confirms the candidate channels to change the operating channel in step 301.

In step 303, the base station assigns a priority to the candidate channels. For example, the base station determines the priority of the candidate channels by taking into account the operating channels of the neighbor cells as shown in FIG. 1.

In step 305, the base station checks whether the incumbent signal is detected in the operating channel.

When detecting the incumbent signal, the base station recognizes that the detected incumbent signal intends to use its operating channel. Thus, the base station checks whether there are candidate channels belonging to the first group in step 307.

When detecting the candidate channels in the first group, the base station checks the number of the candidate channels of the first group in step 309.

When the number of the candidate channels in the first group is two or more in step 309, the base station selects a candidate channel for changing the operating channel by taking into account signal strengths received in the candidate channels of the first group in step 311. For instance, the base station selects the candidate channel of the weakest signal of the CBP packet among the candidate channels, as the candidate channel for changing the operating channel.

In step 313, the base station changes the operating channel to the selected candidate channel.

Meanwhile, when there is a single candidate channel in the first group in step 309, the base station changes the operating channel to the single candidate channel in step 313.

When there are no candidate channels in the first group in step 307, the base station checks whether there are candidate channels belonging to the second group with the second highest priority after the first group in step 315.

Confirming the candidate channels in the second group, the base station checks the number of the candidate channels in the second group in step 317.

When the number of the candidate channels of the second group is two or more in step 317, the base station selects a candidate channel for changing the operating channel by taking into account signal strengths received in the candidate channels in step 319. For instance, the base station selects the candidate channel of the weakest signal of the CBP packet among the candidate channels, as the candidate channel for changing the operating channel.

Next, the base station changes the operating channel to the selected candidate channel in step 313.

Meanwhile, when there is a single candidate channel in the second group in step 317, the base station changes the operating channel to the single candidate channel in step 313.

When there are no candidate channels in the second group in step 315, the base station checks the number of the candidate channels of the third group of the lowest priority in step 321.

When the number of the candidate channels of the third group is two or more, the base station selects a candidate channel for changing the operating channel by taking into account signal strengths received in the candidate channels in step 323. For instance, the base station selects the candidate channel of the weakest signal of the CBP packet among the candidate channels, as the candidate channel for changing the operating channel.

Next, the base station changes the operating channel to the selected candidate channel in step 313.

When there is a single candidate channel in the third group in step 321, the base station changes the operating channel to the single candidate channel in step 313.

Next, the base station finishes this process.

Now, descriptions explain a structure of the base station for selecting the candidate channel to change the operating channel based on the priority given to the candidate channels.

Figure 4:
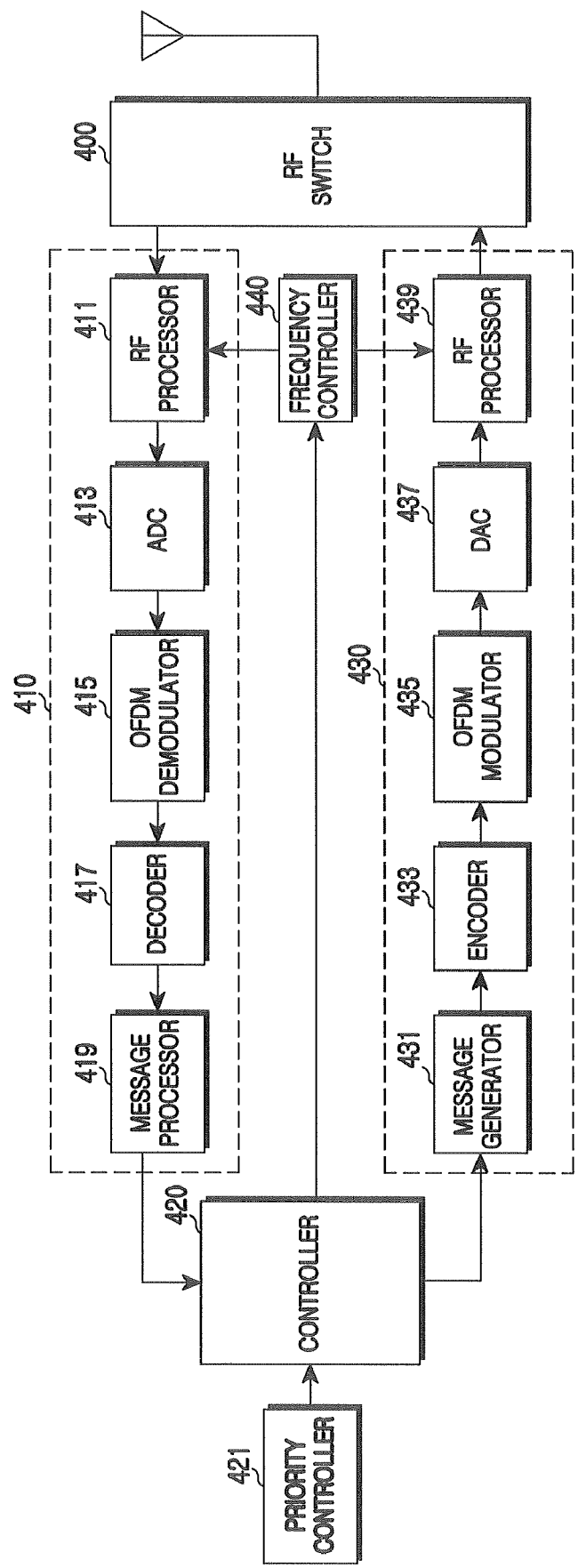
FIG. 4 is a block diagram of a base station for giving priority to the candidate channels in the wireless communication system according to an exemplary embodiment of the present invention.

FIG. 4 is a block diagram of the base station for giving priority to the candidate channels in the wireless communication system according to an exemplary embodiment of the present invention. While the wireless communication system is assumed to adopt a Time Division Duplex (TDD) scheme, the present invention is application to other communication schemes.

The base station of FIG. 4 includes a Radio Frequency (RF) switch 400, a receiver 410, a controller 420, a transmitter 430, and a frequency controller 440.

According to a TDD signal, the RF switch 400 connects an antenna and the receiver 410 in the reception period and connects the antenna and the transmitter 430 in the transmission period.

The receiver 410 includes an RF processor 411, an Analog/Digital Converter (ADC) 413, an Orthogonal Frequency Division Multiplexing (OFDM) demodulator 415, a decoder 417, and a message processor 419.

The RF processor 411 converts an RF signal received in the designated channel to a baseband analog signal under the control of the frequency controller 440. The ADC 413 converts the analog signal output from the RF processor 411 to digital sample data. The OFDM demodulator 415 converts the time-domain sample data output from the ADC 413 to frequency-domain data using Fourier transform. The OFDM demodulator 415 performs the fast Fourier transform using a Fast Fourier Transform (FFT) operator.

The decoder 417 selects data of subcarriers to be received from the frequency-domain data output from the OFDM demodulator 415. Next, the decoder 417 demodulates and decodes the selected data according to a preset Modulation and Coding Scheme (MCS) level.

The message processor 419 decomposes the control message output from the decoder 417 and provides the result to the controller 420. For example, the message processor 419 provides the CBP packets received in the operating channels of the neighbor base stations to the controller 420.

The controller 420 controls the entire operation of the base station to execute the CR function. For example, upon detecting the incumbent signal in the operating channel, the controller 420 selects the candidate channel to change the operating channel by taking into account the priority of the candidate channels. Next, the controller 420 controls the frequency controller 440 to change the operating channel to the selected candidate channel.

The controller 420 confirms the operating channel information of the neighbor base stations and the candidate channel information set to the third group from the CBP packets fed from the message processor 419 and provides the confirmed information to the priority controller 421. The controller 420 controls to send the operating channel information of the base station and the candidate channel information of the third group information using the CBP packets.

The priority controller 421 determines the priority of the candidate channels using the operating channels of the neighbor base stations and the information of the candidate channels set to the third group provided from the controller 420. For example, the priority controller 421 defines the candidate channels used as the operating channels of the neighbor base stations among the candidate channels, as the third group of the lowest priority. Next, the priority controller 421 defines the candidate channels set to the third group of the neighbor base stations among the candidate channels not set to the third group, to the second group. Lastly, the priority controller 421 defines the candidate channels set to neither the second group nor the third group, as the first group of the highest priority.

The controller 420 selects the candidate channel to change the operating channel based on the priority determined at the priority controller 421. When the same priority group includes two or more candidate channels, the controller 421 selects the candidate channel to change the operating channel by taking into account the receive signal strength of the CBP packets received in the candidate channels. For example, the controller 421 selects the candidate channel of the weakest signal strength of the CBP packet.

The frequency controller 440 controls the channel for sending the signal from the transmitter 430 and the channel for receiving the signal at the receiver 410 under the control of the controller 420.

The transmitter 430 includes a message generator 431, an encoder 433, an OFDM modulator 435, a Digital/Analog Converter (DAC) 437, and an RF processor 439.

The message generator 431 generates the CBP packets to be sent to the neighbor base stations under the control of the controller 420. For example, the message generator 431 generates the CBP packet including the operating channel information of the base station under the control of the controller 420. Under the control of the controller 420, the message generator 431 also generates the CBP packet including the information of the candidate channels set to the third group at the priority controller 421.

The encoder 433 encodes and modulates the message output from the message generator 431 according to the corresponding MCS level. The OFDM modulator 435 converts the frequency-domain data output from the encoder 433 to time-domain sample data (OFDM symbols) using Inverse FFT (IFFT). The OFDM modulator 435 conducts the IFFT using an IFFT operator.

The DAC 437 converts the sample data output from the OFDM modulator 435 to an analog signal. The RF processor 439 converts the analog signal output from the DAC 437 to an RF signal of the relevant channel under the control of the frequency controller 440.

As set forth above, the wireless communication system with the CR function constitutes the candidate channel set by assigning the priority to the candidate channels so as to maximize the distance between the cells which use the channels. Therefore, when the cells using the CR function change their operating channel, the interference influence between the neighbor cells can be mitigated.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for determining priority of candidate channels at a serving node in a wireless communication system which uses a cognitive radio function, the method comprising:
   confirming an operating channel of and a set of candidate channels of at least one neighbor cell, wherein the candidate channels in the set have a lowest priority for the at least one neighbor cell;
   setting a candidate channel, used as the operating channel of the neighbor cell, among a plurality of candidate channels changeable to the operating channel of the serving node, to a third group of lowest priority;
   setting candidate channels from the set of candidate channels of the neighbor cell, among the plurality of candidate channels of the serving node and not set to the third group, to a second group; and
   setting candidate channels, set to neither the second group nor the third group, to a first group of highest priority.

2. The method of claim 1, wherein confirming the operating channel of the neighbor cell and the set of candidate channels of the neighbor cell comprises:
   confirming the operating channel and the set of candidate channels, the third group by the neighbor cell, from a coexistence beacon protocol packet received from the neighbor cell.

3. The method of claim 1, further comprising:
   transmitting operating channel information of the serving node to at least one neighbor cell using a coexistence beacon protocol packet.

4. The method of claim 1, further comprising:
   after setting the third group, transmitting information of the candidate channels set to the third group to at least one neighbor cell using a coexistence beacon protocol packet.

5. A method for changing an operating channel at a serving node in a wireless communication system which uses a cognitive radio function, the method comprising:
   setting at least one priority group with at least one candidate channel changeable to the operating channel by taking into account an operating channel and a set of candidate channels of at least one neighbor cell, wherein setting the priority group comprises:
      confirming the operating channel and the set of candidate channels of the at least one neighbor cell, wherein the candidate channels in the set have lowest priority for the at least one neighbor cell;
      setting candidate channels, used as the operating channel of the at least one neighbor cell, among a plurality of candidate channels changeable to the operating channel of the serving node, to a third group of lowest priority;

setting candidate channels from the set of candidate channels of the at least one neighbor cell, among the plurality of candidate channels of the serving node and not set to the third group, to a second group; and setting candidate channels, set to neither the second group nor the third group, to a first group of highest priority;

responsive to detecting an incumbent signal, selecting a candidate channel to change the operating channel based on priority of candidate channels of the serving node; and changing the operating channel of the serving node to the selected candidate channel.

6. The method of claim 5, wherein confirming the operating channel of the neighbor cell and the set of candidate channels set to the third group by of the neighbor cell comprises:

confirming the operating channel and the set of candidate channels from a coexistence beacon protocol packet received from the neighbor cell.

7. The method of claim 5, further comprising:

transmitting operating channel information of the serving node to at least one neighbor cell using a coexistence beacon protocol packet.

8. The method of claim 5, further comprising:

after setting the third group, transmitting information of the candidate channels set to the third group to at least one neighbor cell using a coexistence beacon protocol packet.

9. The method of claim 5, wherein selecting the candidate channel comprises:

selecting a candidate channel to change the operating channel in a descending order of priority among priority groups of the candidate channels of the serving node.

10. The method of claim 9, wherein selecting the candidate channel further comprises:

when one priority group comprises at least two candidate channels, comparing a receive signal strength of coexistence beacon protocol packets received in the candidate channels; and selecting a candidate channel of a weakest signal strength among the candidate channels as the candidate channel to change the operating channel.

11. The method of claim 9, wherein selecting the candidate channel further comprises:

when one priority group comprises no candidate channel, selecting the candidate channel to change the operating channel by taking into account candidate channels of a priority group lower than a priority group in the priority.

12. An apparatus for a base station to use a cognitive radio function in a wireless communication system, the apparatus comprising:

a priority controller configured to generate at least one priority group with at least one candidate channel changeable to an operating channel of the base station by taking into account an operating channel and a set of candidate channels of at least one neighbor cell, wherein the priority controller is further configured to set candidate channels used as the operating channel of the at least one neighbor cell, among a plurality of candidate channels changeable to the operating channel of the base station, to a third group of lowest priority, set candidate channels from the set of candidate channels of the at least one neighbor cell, among the plurality of candidate channels of the base station and not set to the third group, to a second group, and set a candidate channel set to neither the second group nor the third group, to a first group of highest priority, wherein the candidate channels in the set have a lowest priority for the at least one neighbor cell;

a controller configured to select, responsive to an incumbent signal being detected, a candidate channel to change the operating channel based on priority of candidate channels of the base station; and a frequency controller configured to change the operating channel to the selected channel under control of the controller.

13. The apparatus of claim 12, further comprising:

a receiver configured to receive a coexistence beacon protocol packet from the neighbor cell, wherein the priority controller is further configured to confirm the operating channel of the neighbor cell using the coexistence beacon protocol packet received through the receiver.

14. The apparatus of claim 12, further comprising:

a transmitter configured to transmit information relating to the operating channel of the base station and a lowest priority group set by the priority controller to at least one neighbor cell using a coexistence beacon protocol packet.

15. The apparatus of claim 14, wherein the transmitter comprises:

a message generator configured to generate the coexistence beacon protocol packet including the information relating to the operating channel of the base station and a coexistence beacon protocol packet including information relating to at least one candidate channel set to the lowest priority group amongst priority groups of the candidate channels of the base station; and a transmitting part configured to transmit at least one coexistence beacon protocol packet generated at the message generator to at least one neighbor cell.

16. The apparatus of claim 12, wherein the controller is further configured to select the candidate channel for the operating channel of the base station in a descending priority order of priority groups of the candidate channels.

17. The apparatus of claim 16, wherein, when one priority group comprises at least two candidate channels, the controller is further configured to compare a receive signal strength of coexistence beacon protocol packet received in each of the candidate channels and select a candidate channel of a weakest signal strength as the candidate channel to change the operating channel.

18. The apparatus of claim 16, wherein, when one priority group comprises no candidate channel, the controller is further configured to select the candidate channel to change the operating channel by taking into account candidate channels of a priority group lower than a priority group in the priority.

* * * * *